(12) United States Patent
Krasowski et al.

(10) Patent No.: US 8,704,654 B1
(45) Date of Patent: Apr. 22, 2014

(54) CIRCUIT FOR COMMUNICATION OVER DC POWER LINE USING HIGH TEMPERATURE ELECTRONICS

(75) Inventors: Michael J. Krasowski, Chagrin Falls, OH (US); Norman F. Prokop, South Euclid, OH (US)

(73) Assignee: The United States of America as Represented by the Administrator of National Aeronautics and Space Administration, Washington, DC (US)

( * ) Notice: Subject to any disclaimer, the term of this patent is extended or adjusted under 35 U.S.C. 154(b) by 1826 days.

(21) Appl. No.: 11/759,570

(22) Filed: Jun. 7, 2007

(51) Int. Cl.
  G08B 1/08 (2006.01)
  H04M 11/04 (2006.01)
  H04Q 1/30 (2006.01)

(52) U.S. Cl.
  USPC ............ 340/538; 455/21; 455/293; 455/309; 455/312; 455/337; 375/324

(58) Field of Classification Search
  USPC ............ 340/358, 538; 455/21, 293, 309, 312, 455/337; 375/324
  See application file for complete search history.

(56) References Cited

U.S. PATENT DOCUMENTS

| | | | | | |
|---|---|---|---|---|---|
| 4,466,458 | A | * | 8/1984 | Leiber | 137/606 |
| 4,553,102 | A | * | 11/1985 | Yoshida | 329/310 |
| 5,521,548 | A | * | 5/1996 | Sugawara | 329/306 |
| 5,610,948 | A | * | 3/1997 | Ninomiya et al. | 375/324 |
| 5,637,933 | A | * | 6/1997 | Rawlings et al. | 307/147 |
| 5,724,002 | A | * | 3/1998 | Hulick | 329/361 |
| 5,764,705 | A | * | 6/1998 | White | 375/324 |
| 5,805,053 | A | * | 9/1998 | Patel et al. | 375/257 |
| 6,005,475 | A | * | 12/1999 | Takasan et al. | 375/258 |
| 6,171,889 | B1 | | 1/2001 | Iwamatsu et al. | |
| 6,188,314 | B1 | * | 2/2001 | Wallace et al. | 340/438 |
| 6,272,452 | B1 | | 8/2001 | Wu et al. | |
| 6,339,221 | B1 | * | 1/2002 | Schubring et al. | 250/338.3 |
| 6,410,938 | B1 | | 6/2002 | Xiang | |
| 6,434,194 | B1 | | 8/2002 | Eisenberg et al. | |
| 6,624,760 | B1 | | 9/2003 | Kinzel et al. | |
| 6,766,221 | B1 | * | 7/2004 | Christiansen | 700/284 |
| 6,798,338 | B1 | * | 9/2004 | Layton | 340/854.6 |
| 6,914,893 | B2 | | 7/2005 | Petite | |
| 6,970,496 | B1 | | 11/2005 | Ben-Bassat et al. | |
| 6,984,570 | B2 | | 1/2006 | Wang | |
| 7,010,594 | B2 | | 3/2006 | Defosse | |
| 7,027,773 | B1 | | 4/2006 | McMillin | |
| 7,074,692 | B2 | | 7/2006 | Chen et al. | |
| 7,122,863 | B1 | | 10/2006 | Ju et al. | |
| 7,154,938 | B2 | | 12/2006 | Cumeralto | |

(Continued)

OTHER PUBLICATIONS

Spry, David, et al., "Electrical Operation of 6H-SiC MESFET at 500° C for 500 Hours in Air Ambient", IMAPS International High Temperature Electronics Conference (HiTEC 2004), Santa Fe, NM, May 17-20, 2004, (May 19, 2004), pp. 1-7.

Primary Examiner — Benjamin C Lee
Assistant Examiner — Quang D Pham
(74) Attorney, Agent, or Firm — Robert H. Earp, III

(57) ABSTRACT

A high temperature communications circuit includes a power conductor for concurrently conducting electrical energy for powering circuit components and transmitting a modulated data signal, and a demodulator for demodulating the data signal and generating a serial bit stream based on the data signal. The demodulator includes an absolute value amplifier for conditionally inverting or conditionally passing a signal applied to the absolute value amplifier. The absolute value amplifier utilizes no diodes to control the conditional inversion or passing of the signal applied to the absolute value amplifier.

9 Claims, 3 Drawing Sheets

(56) References Cited

U.S. PATENT DOCUMENTS

| | | |
|---|---|---|
| 7,163,866 B2 | 1/2007 | Assaderaughi |
| 7,742,393 B2* | 6/2010 | Bonicatto et al. .............. 370/216 |
| 2001/0044291 A1* | 11/2001 | Vaisanen ...................... 455/324 |
| 2002/0171544 A1* | 11/2002 | Schmurr ....................... 340/538 |
| 2003/0071683 A1* | 4/2003 | Shau ............................. 329/347 |
| 2003/0219062 A1* | 11/2003 | Egidio .......................... 374/170 |
| 2004/0060696 A1* | 4/2004 | Schultz et al. ............ 166/250.01 |
| 2004/0082304 A1* | 4/2004 | Gehring ........................ 455/205 |
| 2004/0120275 A1* | 6/2004 | Zheng et al. ................. 370/320 |
| 2004/0120424 A1* | 6/2004 | Roberts ......................... 375/327 |
| 2005/0098318 A1* | 5/2005 | Rodney et al. ................ 166/302 |
| 2006/0025099 A1* | 2/2006 | Jung et al. ..................... 455/313 |
| 2006/0064291 A1 | 3/2006 | Pattipatti et al. |
| 2006/0145755 A1* | 7/2006 | Chen et al. ...................... 330/10 |
| 2006/0186342 A1* | 8/2006 | Burger et al. ............ 250/370.01 |
| 2006/0191687 A1* | 8/2006 | Storm et al. .................. 166/302 |
| 2006/0286957 A1* | 12/2006 | Oishi ............................ 455/323 |
| 2007/0010223 A9* | 1/2007 | Demir et al. .................. 455/205 |
| 2007/0115112 A1* | 5/2007 | Elwell et al. ................. 340/538 |
| 2007/0273205 A1* | 11/2007 | Aoyama ............................ 307/3 |
| 2008/0028863 A1* | 2/2008 | Kurtz et al. ..................... 73/727 |
| 2008/0090544 A1* | 4/2008 | Hubert et al. ................. 455/334 |
| 2010/0091103 A1* | 4/2010 | Peltonen et al. ................ 348/82 |

* cited by examiner

CIRCUIT FOR COMMUNICATION OVER DC POWER LINE USING HIGH TEMPERATURE ELECTRONICS

ORIGIN OF THE INVENTION

The invention described herein was made by employees of the Untied States Government and may be manufactured and used by or for the Government for Government purposes without the payment of any royalties thereon or therefore.

BACKGROUND OF THE INVENTION

1. Field of the Invention

The present invention relates to communications over power lines, and more specifically to circuits and systems for use in high temperature environments for demodulating data signals transmitted over power lines and transmitting modulated data signals over power lines.

2. Description of Related Art

Environments in which it would be desirable to operate sensors and actuators that employ semiconductor electronics can have ambient temperatures that are too high for the electronics to properly operate. For example, high temperatures are generated by metal smelting or sintering processes, steel production, down hole deep drilling, and vehicle engine operation, such as aircraft engine operation. The electronic components in conventional sensors and actuators may not operate properly under the high temperature conditions generated by such processes.

Further, environments in which it would be desirable to operate sensors and actuators that employ semiconductor electronics can experience ionizing radiation levels that are too high for the electronics to properly operate. The electronic components may experience so called latch-up when operated in such environments. Environments having high ionizing radiation levels include outer space, for example Earth orbital environments, and various planetary surfaces.

Conventional sensors and actuators typically require separate power supply and data conductors. Extra conductors can increase system weight, cost, required space, and the risk of equipment failure. It would be desirable to provide a circuit for a sensor or actuator that employs a common power and data conductor and which is able to withstand high ambient temperature conditions or high ionizing radiation levels.

BRIEF SUMMARY OF THE INVENTION

Provided is a high temperature communications circuit including a power conductor for concurrently conducting electrical energy for powering circuit components and transmitting a modulated data signal, and a demodulator for demodulating the data signal and generating a serial bit stream based on the data signal. The demodulator includes an absolute value amplifier for conditionally inverting or conditionally passing a signal applied to the absolute value amplifier. The absolute value amplifier utilizes no diodes to control the conditional inversion or non-inversion of the signal applied to the absolute value amplifier.

Further provided is a high temperature communications circuit including a power conductor for concurrently conducting electrical energy for powering circuit components and transmitting a modulated data signal, and a demodulator for demodulating the data signal and generating a serial bit stream based on the data signal. The demodulator is adapted for operation in an ambient temperature of at least 200° C.

DETAILED DESCRIPTION OF THE INVENTION

Figure 1:
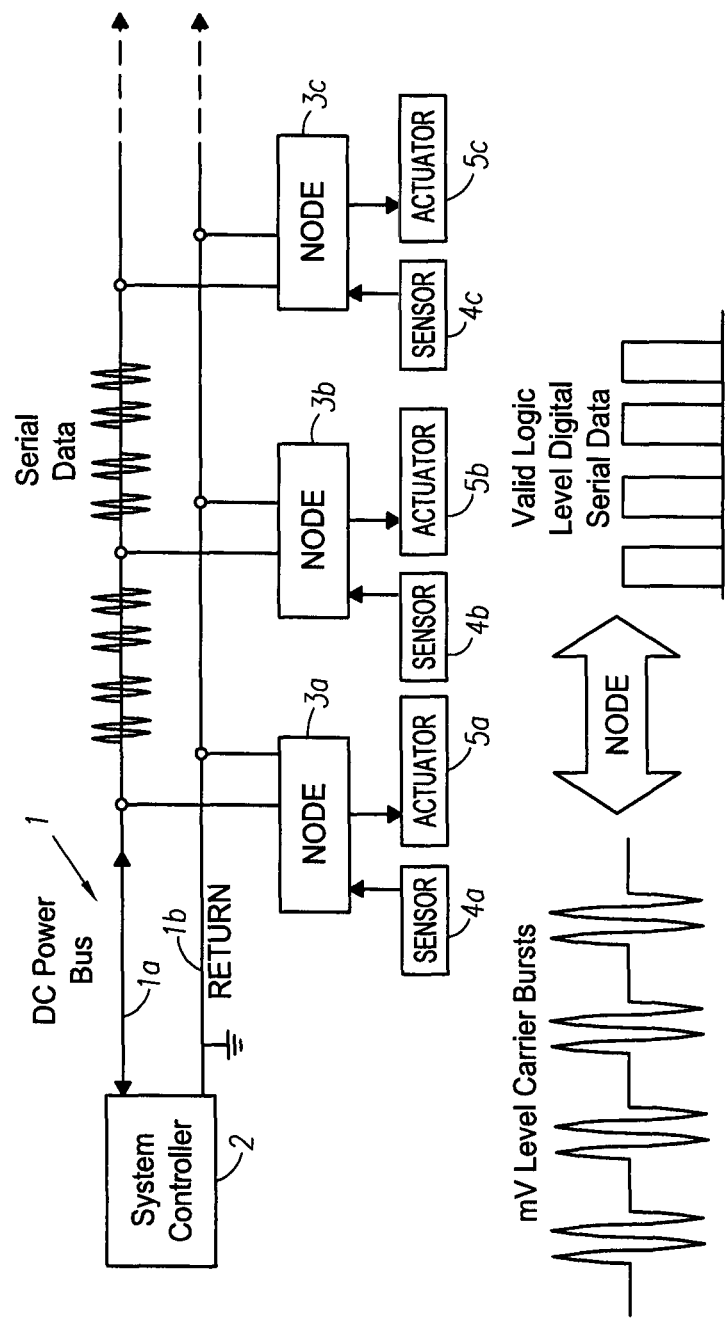
FIG. 1 is a block diagram of a system that communicates over a DC power bus.

FIG. 1 shows a block diagram of a system that communicates over a power bus, for example, a direct current (DC) power bus 1. The DC power bus includes a "hot" energized line 1a and a return line 1b. DC power is supplied by a system controller 2, such as an engine controller, for example. The DC power bus 1 conducts electrical energy to one or more nodes 3a-3c, to power devices located at the nodes 3a-3c. The devices powered by the DC power bus at each node can include sensors 4a-4c and actuators 5a-5c. One or more sensors or actuators can be provided at each node 3a-3c.

The system controller 2 generates a modulated data signal, such as an on-off-keyed data signal, which is transmitted on the DC power bus. It is to be appreciated that other types of modulated data signals besides on-off-keyed data signals could be generated by the system controller and transmitted on the DC power bus. A circuit at each node, for example, a circuit within a sensor or actuator, demodulates the data signal and is capable of responding to the data signal. The circuit can further include a transmitter for generating additional modulated data signals for transmission on the DC power bus. Accordingly, data can be transmitted from the system controller 2 to the nodes 3a-3c, and from any node to any other node or the system controller. The system provides for asynchronous communications among the nodes 3a-3c and system controller 2 over the DC power bus. Further, each node can monitor its own data transmissions by demodulating said transmissions from the DC power bus. The modulated data transmissions on the DC power bus are in the form of data bursts, for example, mV level carrier bursts. The circuit at each node demodulates the modulated data signal and generates a serial bit stream based on the data signal.

Figure 2:
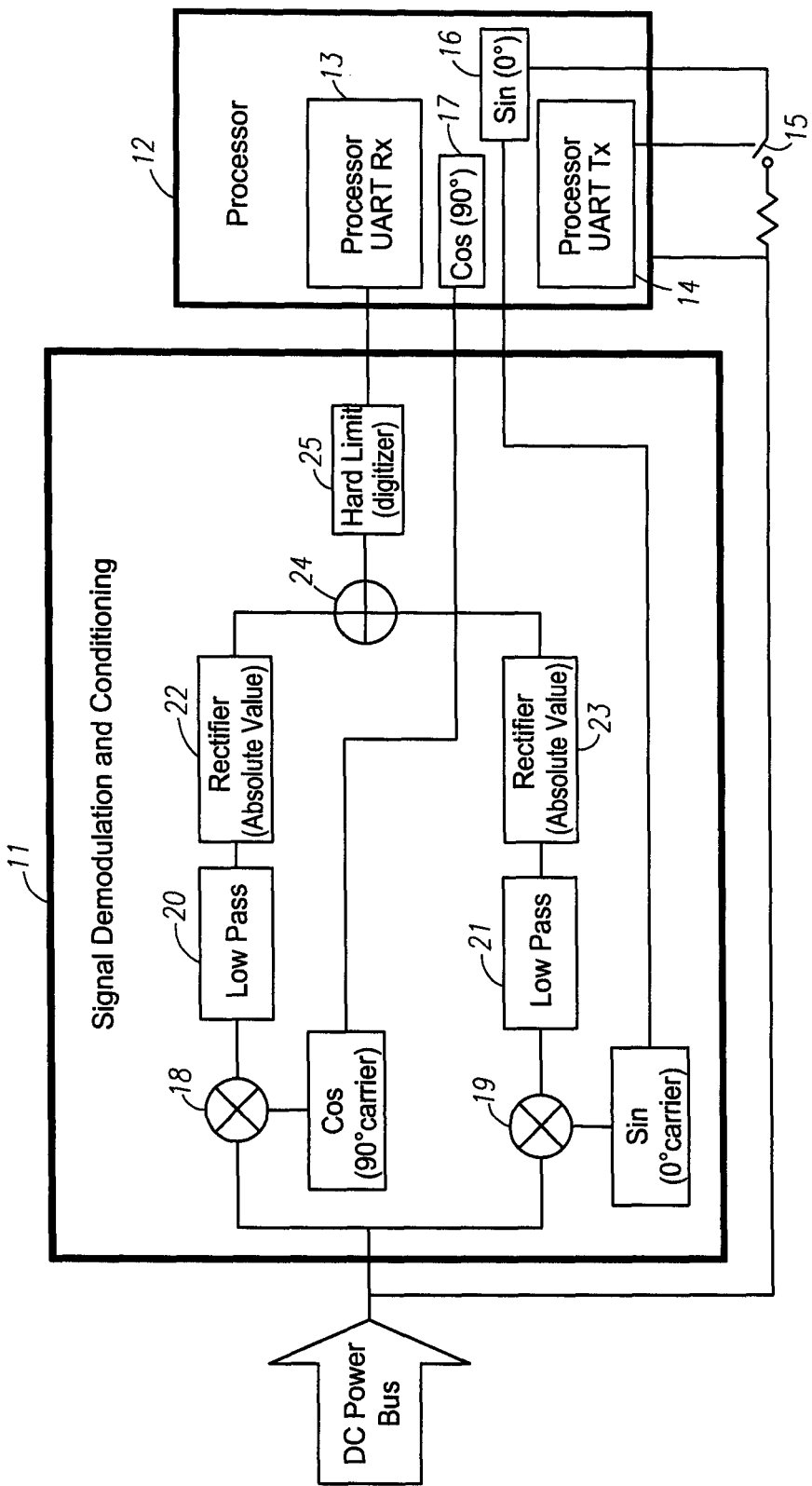
FIG. 2 is a block diagram of a circuit for transmitting and receiving data over a DC power bus.

FIG. 2 is a block diagram of an example circuit for transmitting and receiving data over the DC power bus. The circuit includes a signal demodulation and conditioning portion 11 and a processor 12. The signal demodulation and conditioning portion 11 and the processor 12 can be included within a sensor or actuator. The processor 12 can control operations of the sensor or actuator, and can monitor an output of the sensor. It is to be appreciated that the circuit can be used with a variety of sensors and actuators, and is not intended to be limited to a particular type of sensor or a particular type of actuator. By including the signal demodulation and conditioning portion 11 and the processor 12 within a sensor or actuator, the benefits of power line communications, local device intelligence (e.g., fast autonomous response to system conditions), and distributed control can be realized.

The signal demodulation and conditioning portion 11 demodulates the modulated data signal and generates the serial bit stream based on the data signal. The processor 12 receives data communications via the serial bit stream. For example, the processor 12 can include a universal asynchronous receiver/transmitter (UART) 13 for receiving asynchronous serial communications from the signal demodulation and conditioning portion 11. The processor 12 can further include a UART 14 for transmitting asynchronous serial communications on the DC power bus. In an embodiment, the transmit UART 14 controls the operation of a switch 15, and the switch 15 controls the application of signal bursts on the DC power bus.

The processor 12 includes a first wave generator 16 and a second wave generator 17. The first wave generator 16 generates a signal that is 90° out of phase with a signal from the second wave generator 17. For example, the first wave generator 16 generates a first square wave or a sine wave ("the 0° signal"), and the second wave generator 17 generates a cosine wave or a second square wave that leads or lags the 0° signal by 90° ("the 90° signal"). The frequency of the waves would be determined by a selected crystal frequency driving the processor's oscillator.

The signal demodulation and conditioning portion 11 receives the modulated data signal from the DC power bus and amplifies the signal via an amplifier (not shown). In an embodiment, the modulated data signal is an on-off-keyed signal. The signal demodulation and conditioning portion 11 demodulates the data signal using an asynchronous quadrature detection technique. The data signal is provided to a first multiplier 18 and a second multiplier 19. The 90° signal from the processor 12 controls an operation of the first multiplier 18. The first multiplier 18 multiplies the data signal by (1) when the 90° signal is positive, and (−1) when the 90° signal is zero or negative. The 0° signal from the processor 12 controls an operation of the second multiplier 19. The second multiplier 19 multiplies the data signal by (1) when the 0° signal is positive, and (−1) when the 0° signal is zero or negative.

The outputs from the multipliers 18, 19 are provided to respective low pass filters 20, 21, for example, low pass Sallen-Key filters. The outputs from the low pass filters 20, 21 are provided to respective absolute value amplifiers 22, 23. The absolute value amplifiers 22, 23 can each include a plurality of separate amplifiers that form, for example, non-inverting and inverting portions of the amplifiers. The absolute value amplifiers 22, 23 are configured to rectify the outputs from the low pass filters 20 and 21, respectively. It is to be appreciated that the absolute value amplifiers could be positive absolute value amplifiers or negative absolute value amplifiers, for generating positive rectified signals and negative rectified signals, respectively.

The outputs from the absolute value amplifiers 22, 23 are summed by a summer 24. The output from the summer 24 is provided to a digitizer 25. The output from the summer 24 is hard limited by the digitizer, by comparison of the output from the summer 24 to a reference voltage level. The output from the digitizer 25 is the serial bit stream, which is provided to the UART receiver 13 of the processor 12.

Figure 3:
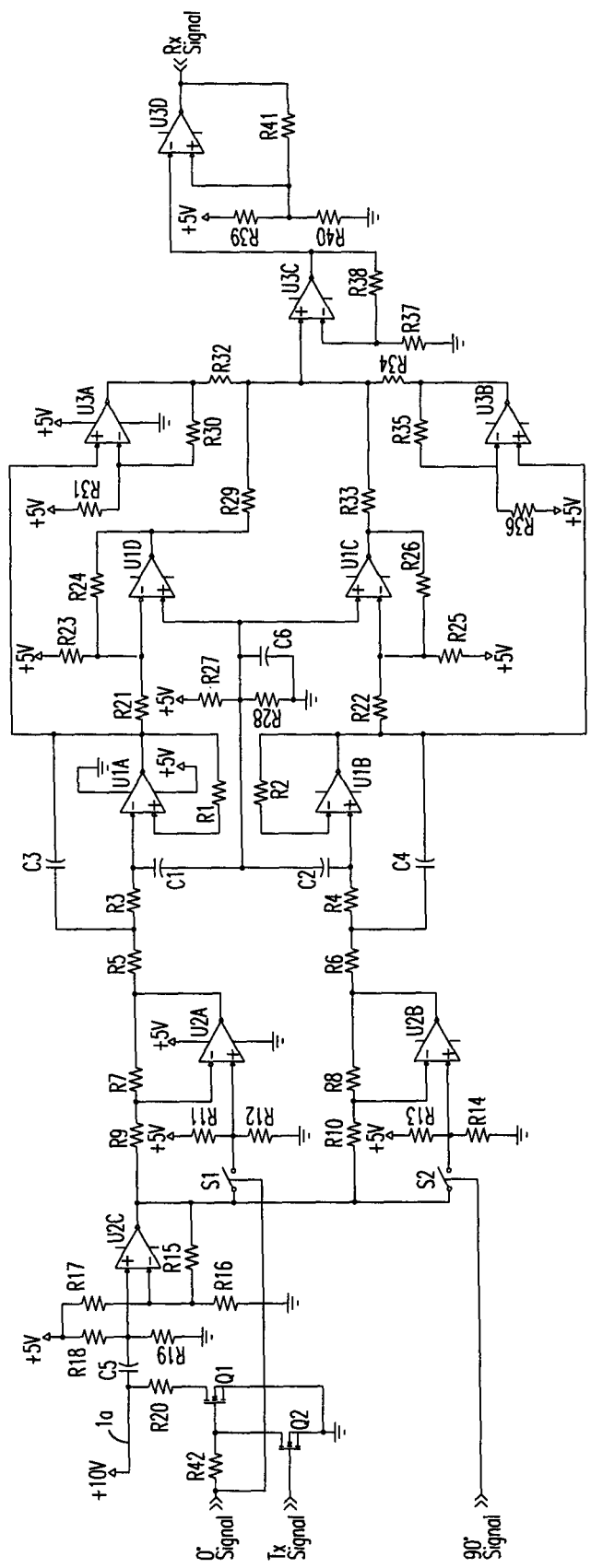
FIG. 3 is a schematic diagram of a circuit for transmitting and receiving data over a DC power bus.

FIG. 3 is a schematic diagram of an example circuit for transmitting and receiving data over a DC power bus. The circuit includes a plurality of resistors, capacitors and solid state electronic components. The circuit in general, and the solid state electronic components specifically, are designed to withstand high temperatures and exposure to ionizing radiation levels that would be harmful to conventional electronics. The circuit and its components (including the processor, not shown) are designed to operate in ambient temperatures of 200° C. or greater, for example, up to 225° C. Further, the circuit and its components are resistant to ionizing radiation. As used herein, the terms "resistant to ionizing radiation" mean radiation tolerant, radiation hardened or strategic radiation hardened, and a device that is radiation tolerant, radiation hardened or strategic radiation hardened is a device that is resistant to ionizing radiation.

A "radiation tolerant" device is rated for a total ionizing dose of up to 300 krad (Si), or lower if required by a specific application (e.g., 100 krad (Si) or 200 krad (Si)), dose rate upset of at least $10^7$ rads (SiO2)/s, dose rate survivability of at least $10^{10}$ rads (SiO2)/s, single event upset to $10^{-10}$ errors/bit-day, neutron fluence hardness of at least $10^{12}$ MeV-cm$^2$/mg, and is single event latch-up immune or has latch-up mitigation.

A "radiation hardened" device is rated for a total ionizing dose of 300-1000 krad (Si), dose rate upset of $10^7$-$10^{10}$ rads (SiO2)/s, dose rate survivability of $10^{10}$-$10^{12}$ rads (SiO2)/s, single event upset of $10^{-10}$-$10^{-11}$ errors/bit-day, neutron fluence hardness of $10^{12}$-$10^{14}$ MeV-cm$^2$/mg, and is single event latch-up immune.

A "strategic radiation hardened" device is rated for a total ionizing dose of greater than 1000 krad (Si), dose rate upset of greater than $10^{10}$ rads (SiO2)/s, dose rate survivability of greater than $10^{12}$ rads (SiO2)/s, single event upset of less than $10^{-11}$ errors/bit-day, neutron fluence hardness of greater than $10^{14}$ MeV-cm$^2$/mg, and is single event latch-up immune.

In an embodiment, the solid state electronic components (i.e., operational amplifiers U1A-U1D, U2A-U2C and U3A-U3D, field-effect transistors Q1, Q2, and controllable switches S1, S2) of the circuit in FIG. 3 are silicon-on-insulator fabricated semiconductor components. Silicon-on-insulator fabricated semiconductor components may withstand high temperatures and exposure to ionizing radiation at levels that would be harmful to conventional electronics. An example amplifier is model HT1104 manufactured by HONEYWELL®. An example field-effect transistor is model HTNFET manufactured by HONEYWELL®. An example controllable switch is model HT1204 manufactured by HONEYWELL®.

The circuit of FIG. 3 shows an example embodiment that includes a DC power bus having a "hot" energized line 1a of 10 VDC. It is to be appreciated that 10 VDC is an example voltage level, and that other voltage levels are possible, such as 12 VDC, for example. As discussed above, a modulated data signal, such as an on-off-keyed data signal, is transmitted on the DC power bus.

A capacitor C5 provides a low impedance path for the modulated data signal, but blocks the 10 VDC of the power bus. An example value for the capacitor C5 is 330 pF. A voltage regulator (not shown), that is powered by the DC power bus, provides local power for the circuit at a reduced DC voltage, for example, 5 VDC.

An amplifier U2C and resistors R15-R19 form an amplifier subcircuit having an example gain of 20. The amplifier subcircuit formed by amplifier U2C and resistors R15-R19 amplify the modulated data signal from the DC power bus. An example value for resistor R15 is 1MΩ, and an example value for resistors R16-R19 is 110 kΩ.

An amplifier U2A, resistors R7, R9, R11 and R12 and a controllable switch S1 form a multiplier subcircuit. The multiplier subcircuit formed by amplifier U2A, resistors R7, R9, R11 and R12 and the controllable switch S1 corresponds to the second multiplier 19 of FIG. 2. Operations of the controllable switch S1 are controlled by a 0° signal, for example a square wave, from a processor (not shown). When the 0° signal has a positive voltage level, the switch S1 is closed and the data signal is multiplied by (1). When the 0° signal has a voltage level of 0 VDC, the switch S1 is open and the data signal is multiplied by (−1). It is to be appreciated that if the data signal is in phase with the 0° signal, the negative portion of the data signal will be simply inverted by the multiplier, while the positive portion will remain unchanged. An example value for the resistors R7, R9, R11 and R12 is 210 kΩ.

An amplifier U2B, resistors R8, R10, R13 and R14 and a controllable switch S2 form another multiplier subcircuit. The multiplier subcircuit formed by amplifier U2B, resistors R8, R10, R13 and R14 and the controllable switch S2 corresponds to the first multiplier 18 of FIG. 2. Operations of the controllable switch S2 are controlled by a 90° signal, for example another square wave, from the processor. The 90° signal is 90° out of phase with the 0° signal. For example, the 90° signal leads the 0° signal by 90°. When the 90° signal has a positive voltage level, the switch S2 is closed and the data signal is multiplied by (1). When the 90° signal has a voltage level of 0 VDC, the switch S2 is open and the data signal is multiplied by (−1). It is to be appreciated that if the data signal is in phase with the 90° signal, the negative portion of the data signal will be simply inverted by the multiplier, while the positive portion will remain unchanged. An example value for the resistors R8, R10, R13 and R14 is 210 kΩ.

An amplifier U1A, resistors R1, R3 and R5, and capacitors C1 and C3 form a first low pass filter, which filters the output of amplifier U2A. The first low pass filter corresponds to low pass filter 21 of FIG. 2. An amplifier U1B, resistors R2, R4 and R6 and capacitors C2 and C4 form a second low pass filter, which filters the output of amplifier U2B. The second low pass filter corresponds to low pass filter 20 of FIG. 2. An example value for the resistors R1 and R2 is 402 kΩ. An example value for the resistors R3-R6 is 210 kΩ. An example value for the capacitors C1-C4 is 330 pF.

The outputs of amplifiers U1A and U1B are provided to respective absolute value amplifiers having non-inverting and inverting portions. The absolute value function is accomplished by both of the non-inverting portions and inverting portions. The absolute value amplifiers rectify the input signal about a reference voltage (a virtual ground). This voltage is determined by a voltage divider formed by resistors R27 and R28, and also resistors R12 and R11, R13 and R14. A first non-inverting portion includes an amplifier U3A, which is configured to pass (i.e., transmit non-inverted) signals from amplifier U1A. The first non-inverting portion conditionally passes the signal from amplifier U1A. When the signal from amplifier U1A is above a threshold voltage, the first non-inverting portion passes the signal. When the signal from amplifier U1A is below a threshold voltage, the output of amplifier U3A is negative saturated and the output is 0 VDC. A first inverting portion includes an amplifier U1D, which is configured to invert signals from amplifier U1A. The first inverting portion conditionally inverts the signal from amplifier U1A. When the signal from amplifier U1A is below a threshold voltage, the first inverting portion inverts the signal. When the signal from amplifier U1A is above a threshold voltage, the output of amplifier U1D is negative saturated and the output is 0 VDC. The absolute value amplifier formed by the first non-inverting and inverting portions corresponds to absolute value amplifier 23 of FIG. 2.

A second non-inverting portion includes an amplifier U3B, which is configured to pass signals from amplifier U1B. The second non-inverting portion conditionally passes the signal from amplifier U1B. When the signal from amplifier U1B is above a threshold voltage, the second non-inverting portion passes the signal. When the signal from amplifier U1B is below a threshold voltage, the output of amplifier U3B is negative saturated and the output is 0 VDC. A second inverting portion includes an amplifier U1C, which is configured to invert signals from amplifier U1B. The second inverting portion conditionally inverts the signal from amplifier U1B. When the signal from amplifier U1B is below a threshold voltage, the second inverting portion inverts the signal. When the signal from amplifier U1B is above a threshold voltage, the output of the amplifier U1C is negative saturated and the output is 0 VDC. The absolute value amplifier formed by the second non-inverting and inverting portions corresponds to absolute value amplifier 22 of FIG. 2.

The absolute value amplifiers rectify the outputs from the respective low pass filters. An example value for capacitor C6 is 0.1 μF. An example value for resistors R21 and R22 is 110 kΩ. An example value for resistors R27 and R28 is 210 kΩ. An example value for resistors R23-26, R30, R31, R35 and R36 is 221 kΩ.

Unlike conventional absolute value amplifiers, the absolute value amplifiers shown in FIG. 3 utilize no diodes to control the conditional inversion or passing of applied signals. Conventional absolute value amplifiers utilize diodes to form rectifying bridges or precision rectifiers (i.e., so called super diodes). However, diodes may fail under high ambient temperature conditions, for example, at temperatures exceeding 125° C. The circuit shown in FIG. 3 is designed to operate in an ambient temperature of at least 200° C. The inverting and non-inverting portions of the absolute value amplifiers of FIG. 3 lack diodes, and the outputs of the inverting and non-inverting portions are permitted to assume negative saturated states.

Outputs from the absolute value amplifiers are summed by a summer subcircuit, which is formed by an amplifier U3C and resistors R29, R32-R34, R37 and R38. The summer subcircuit corresponds to the summer 24 of FIG. 2. An example value for resistors R29 and R32-R34 is 221 kΩ. An example value for resistors R37 and R38 is 110 kΩ.

The output from the summer subcircuit is provided to a digitizer subcircuit, which is formed by an amplifier U3D and resistors R39-R41. The digitizer subcircuit corresponds to the digitizer 25 of FIG. 2. The output from the summer subcircuit is hard limited by the digitizer subcircuit, by comparison of the output of the summer subcircuit to a reference voltage level. The output from the digitizer subcircuit (Rx in FIG. 3) is a serial bit stream, which is provided to a UART receiver of the processor (not shown). When a periodic signal, for example a sinusoidal signal, of appropriate frequency is present on the DC power bus, the output of the digitizer is a logical "0." When the periodic signal is not present on the DC power bus, the output of the digitizer is a logical "1." An example value for the resistor R39 is 56.2 kΩ. An example value for the resistor R40 is 20 kΩ. An example value for the resistor R41 is 221 kΩ.

The serial bit stream Rx that is provided to the processor is a demodulated serial data communication that was transmitted over a power conductor (e.g., the DC power bus). The communication was demodulated using an asynchronous quadrature detection technique based on the 0° and 90° reference signals from the processor.

The processor includes a transmit UART, as discussed above with respect to FIG. 2. The transmit UART provides a serial data transmission (Tx in FIG. 3) from the processor. The output of the transmit UART, Tx, controls the operation of a field-effect transistor (FET) Q2, for example, an N-channel power FET, via a connection to transistor's gate. The 0° signal from the processor is connected to the gate of another FET Q1 through a resistor R42, for example, a 2 kΩ resistor. The drain of transistor Q2 is connected to the gate of transistor Q1. The drain of transistor Q1 is connected to the DC power bus through a resistor R20, for example, a 100Ω resistor.

When the output of the transmit UART, Tx, is a logical "0", the transistor Q2 is off. The 0° signal causes the transistor Q1 to turn on and off according to the frequency of the 0° signal. When turned on, the transistor Q1 sinks current from the DC power bus through resistor R20. Turning transistor Q1 on and off via the 0° signal creates a periodic signal, for example a sinusoidal signal, on the DC power bus.

When the output of the transmit UART, Tx, is a logical "1", the transistor Q2 is turned on, pulling the gate of transistor Q1 to ground to turn off transistor Q1. It is to be appreciated that a logical "1" from the transmit UART is represented as the absence of a periodic signal on the DC power bus, and that a logical "0" from the transmit UART is represented as the presence of a periodic signal on the DC power bus. Further, the subcircuit formed by transistors Q1 and Q2 and resistors R20 and R42 form a transmitter subcircuit for transmitting an on-off-keyed modulated data signal on the DC power bus.

As discussed above, a voltage regulator (not shown), that is powered by the DC power bus, provides local power for the circuit shown in FIG. 3. The regulator provides a reduced DC voltage, for example, 5 VDC, for powering circuit components such as the amplifiers. The modulated data signal imposed on the DC power bus would not substantially present itself upon the DC output of the regulator. The voltage of the DC power bus with a modulated data signal present would exceed the drop out voltage of the regulator and also be within the regulator's power supply rejection specifications.

In FIG. 3, the 0° signal from the processor is connected to the gate of transistor Q1 through the resistor R42. It is to be appreciated that the 90° signal, rather than the 0° signal, could be connected to the gate of transistor Q1 through the resistor R42.

A demodulator, processor and transmitter as discussed above can be included in an intelligent sensor or actuator for use in high temperature and high ionizing radiation environments, to achieve power line communications in such environments.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A high temperature communications circuit, comprising:
   a power conductor for concurrently conducting electrical energy for powering components of the circuit and transmitting a modulated data signal; and
   a demodulator for demodulating the modulated data signal and generating a serial bit stream based on the modulated data signal from the power conductor, wherein the demodulator includes a first stage being a capacitively coupled pre-amplifier to amplify alternating current (AC) signal components from the power conductor which include the modulated data signal while blocking the direct current (DC) power, and a second stage comprised of a dual channel circuit whereby the modulated data signal is inverted or non-inverted conditionally to generate an output of each channel of the dual channel circuit upon logic states of first and second externally applied square waves in quadrature whose frequency is determined by a selected crystal driving an oscillator of a processor in communication with the demodulator of the high temperature communications circuit to receive the serial bit stream, wherein the first channel of the dual channel circuit is dedicated to the first square wave applied to the modulated data signal and the second channel of the dual channel circuit is dedicated to the second square wave applied to the modulated data signal;
   wherein the demodulator is asynchronous with respect to the modulated data signal and wherein the demodulator includes an absolute value amplifier connected to each channel of the dual channel circuit for conditionally inverting or conditionally passing the output of the second stage applied to the absolute value amplifier, said absolute value amplifier including:
      an inverting portion for conditionally inverting the output of the second stage applied to the absolute value amplifier, wherein the inverting portion does not utilizes any diodes and includes an amplifier having an output which is in a negative saturated state when the inverting portion is not inverting the output of the second stage applied to the absolute value amplifier,
      a non-inverting portion for conditionally passing the output of the second stage applied to the absolute value amplifier, wherein the non-inverting portion does not utilizes any diodes and includes another amplifier, said other amplifier having an output which is in a negative saturated state when the non-inverting portion is not passing the output of the second stage applied to the absolute value amplifier, and
      a summer for summing the outputs of the inverting portion and the non-inverting portion from each channel of the dual channel circuit to output a data signal used for generating said serial bit stream;
   wherein the demodulator is adapted for operation in an ambient temperature of at least 200° C.;
   wherein the modulated data signal is an on-off-keyed signal, and the demodulator demodulates the modulated data signal using an asynchronous quadrature detection technique.

2. The circuit as set forth in claim 1, wherein the demodulator comprises a plurality of silicon-on-insulator fabricated semiconductor components.

3. The circuit as set forth in claim 1, wherein the demodulator is resistant to ionizing radiation.

4. The circuit as set forth in claim 3, wherein the demodulator is a radiation hardened device or a strategic radiation hardened device.

5. The circuit as set forth in claim 1, wherein the demodulator contains a third stage comprised of a low pass filter applied to each channel of the dual channel circuit which filters all AC signals to zero which are not at the frequency of the two square waves in quadrature and provides an output of the low pass filter to the respective absolute value amplifier.

6. The circuit as set forth in claim 5, wherein the demodulator contains a fourth stage comprised of the absolute value amplifier connected to each channel of the dual channel circuit to receive the output of the respective low pass filter to generate four channel outputs in which each absolute value amplifier is configured to pass only positive in polarity signals and invert only negative polarity signals of the output of the respective low pass filter.

7. The circuit as set forth in claim 6, wherein the demodulator contains a fifth stage comprised of the summer to combine the aforementioned four channels from the fourth stage.

8. The circuit as set forth in claim 7, wherein the demodulator contains a sixth stage to compare the output from the fifth stage with a reference to generate the serial bit steam.

9. The circuit as set forth in claim 1, further comprising a seventh separate stage whereby the processor of the high temperature communications circuit modulates and transmits an outgoing digital data stream in an on-off keyed fashion on the power conductor.

* * * * *